United States Patent [19]

Griesing

[11] Patent Number: 4,959,829

[45] Date of Patent: Sep. 25, 1990

[54] DUAL CABLE COMMUNICATION SYSTEM

[75] Inventor: John Griesing, Nashua, N.H.

[73] Assignee: Wang Laboratories, Inc., Lowell, Mass.

[21] Appl. No.: 331,468

[22] Filed: Mar. 30, 1989

[51] Int. Cl.$^5$ .............................................. H04J 3/02
[52] U.S. Cl. ................................. 370/85.3; 370/85.11
[58] Field of Search .................... 370/85, 88, 94, 85.1, 370/85.2, 85.3, 85.11; 340/825.5, 825.51

[56] References Cited

U.S. PATENT DOCUMENTS

| 4,621,360 | 11/1986 | Inoue ........................................ 370/85 |
| 4,638,311 | 1/1987 | Gerety ..................................... 370/85 |
| 4,652,873 | 3/1987 | Dolsen et al. ........................... 370/85 |
| 4,755,990 | 7/1988 | Bohler et al. ........................... 370/85 |

Primary Examiner—Douglas W. Olms
Assistant Examiner—Wellington Chin

Attorney, Agent, or Firm—Michael H. Shanahan; Kenneth L. Milik

[57] ABSTRACT

Apparatus and method for communicating between two or more cable interface units on a local area network such that each cable interface unit supports the International Standard Organization's 802.3 standard with the exception that two communication channels or paths are connected between the cable interface units. Only data is transferred on the first communication channel while a signal indicating usage of the first communication medium is broadcast on the second communication channel. Each cable interface unit on the network monitors the second communication channel while transmitting on the first. If it is determined that two cable interface units are transmitting simultaneously both cable interface units notify their respective communicating devices to cease transmission. Retransmission will be attempted at a later time.

3 Claims, 4 Drawing Sheets

ACTIVITY DETECTION CIRCUIT

DUAL CABLE COMMUNICATION SYSTEM

FIELD OF THE INVENTION

The present invention relates generally to data communication systems and more specifically to communication between computer systems and terminals adhering to the ISO 802.3 standard for communication but utilizing one transmission path to transfer information, and a second transmission path to signal use of the first tramsmission path.

BACKGROUND OF THE INVENTION

The use of computer systems in the daily operations of business has become widespread. It is not unusual for each worker in a large company to have a personal computer on his or her desk to allow for rapid transfer of messages and information to other workers. These personal computers may be connected to larger computer systems so as to provide access to a richer set of application programs, share expensive printers and disk drives, and offer a more powerful computing environment than otherwise can be offered by a personal computer alone. Workers sharing these systems may be geographically dispersed within a building of many floors or may housed in different buildings in a campus environment.

Yet in order to utilize the capabilities of a central computer system a communications path must be established between each personal computer and the centralized system. A conventional means of coupling each personal computer to a larger shared system is via a coaxial cable connection arranged in a star or radial configuration. Thus each personal computer has an exclusive communication path to the larger system. While a star or radial configuration has the advantage of providing faster communication since the path is not shared by other users, it has the disadvantage that as more personal computers are connected to the computer system, more coaxial cable must be used to create the communication paths. Since the cost of installing the coaxial cable through the ducts and ceilings of a building is a substantial portion of the total cost of providing a personal computer connection to a shared system, a means to reduce the per terminal installation cost is desirable.

Metcalfe et al, U.S. Pat. No. 4,063,220, describes a means of connecting a plurality of computer systems and peripheral devices to a single transmission cable allowing each device on the cable to communicate with all other devices. This approach to connectivity eliminates the need for each communicating computer system or terminal device to be connected to each other by a dedicated transmission path, and thus decreases the complexity of the wiring scheme needed to support the communication.

In order to share access to the common transmission cable among a plurality of communicating devices, the system of Metcalfe requires that all computer systems o terminals transferring information make an initial determination that no other device is presently utilizing the cable. This procedure prevents the collision of data on the cable by separate devices. If it is found that another device is utilizing the medium, transmission can not be initiated until the cable is idle.

Because it is possible for two devices to start a transmission at nearly precisely the same instant, collision can still occur even when both tranmitting devices have adhered to the above rule. Thus in order to avoid this problem, Metcalfe specifies that while transmitting, each communicating device sense the electrical energy level on the cable, and if this energy level is greater than what would be expected due to its own data transmission a collision be declared. Once determining that a collision has occurred, a device must stop transmitting and await another appropriate time to retransmit the information. This technique used to determine whether a collision has occurred on the cable is known as CSMA/CD, Carrier Sense Multiple Access with Collision Detection.

This procedure for transferring information on a single cable while providing for the potential of collision which is described above has matured into an international standard supported by the International Standards Organization and known as the 802.3 standard (ISO 8802/3), which is incorporated by reference into this application. The 802.3 standard specifies a network protocol implementing CSMA/CD. Stations conforming to this standard transmit a specific signal which allow stations to transmit and receive data while detecting collisions with other transmitters. The actual transmitted signal consists of both a DC and AC component. The AC component is used to convey the information or data to be sent, and the DC component is used to implement the collision detection function. Stations attached to the cable can easily detect the carrier by measuring the DC signal level. If more than one station is trying to access the cable at the same time, the DC component will add from each transmitting station. This increased magnitude of DC level can be detected by the attached stations as a collision. The 802.3 standard specifies the transmission media to be a 50 ohm characteristic impedance coaxial cable with a maximum length not to be exceeded. The cable is terminated on either end with matching 50 ohm terminations. When the AC component is transmitted, the signal propogates down the cable in either direction, and terminates at the ends into the 50 ohm terminators. When the DC component is transmitted it is sent out as a constant current. This constant current will develop a voltage on the cable due to the resistance of the cable and the 50 ohm terminators. When the cable is short the resistance of the cable is negligible in comparison with the 50 ohm terminating impedances and the voltage developed is primarily dependent on the terminators. In this case it is relatively easy to determine if a collision occurs on the cable. When the cable becomes longer than the maximum length allowed, the resistance of the cable is no longer negligible. The voltage on the cable is now primarily a function of the cable resistance and DTE placement. Stations on the cable will detect widely different voltage levels from the same current source, and thus DC collision detection becomes difficult if not imposssible to implement. Since the 802.3 standard requires the terminators to be a 50 ohm characteristic impedance, the cable length is defined to be no longer than 500 meters when ultilizing the cable specified by this standard. Longer cable runs can only be accomplished through use of repeaters or amplifiers to boost the energy to an acceptable level for further transmission of the signal along a greater cable length. These repeaters are of course an added expense to network implementation, and thus it is desireable to minimize the need for these devices by increasing the the maximum length of transmissions without using repeaters.

It is a first object of the invention to provide for reliable communication between any two communicating devices in a network while increasing the length of cable that may be used in a network utilizing a collision detection scheme similiar to CSMA/CD.

Another object of the invention is to modify an implementation of the 802.3 standard so as to increase the distances between communicating devices without the addition of repeaters.

A still further object of the invention is to separate the collision detection signal from the transmit or receive signal so as to prevent noise from one signal possibly interferring with the interpretation of the other.

SUMMARY OF THE INVENTION

This invention provides apparatus for overcoming the distance limitations of a ISO 802.3 network using dual coaxial cable or another dual communication medium.

In practicing the invention, a communicating device is connected to a pair of cables on a network using a collision detection mechanism that is functionally similiar but not equivalent to CSMA/CD. Each such device on the network transmits or receives information to or from all other stations via these cables while otherwise adhering to the ISO 802.3 standard. One cable is used to transmit and receive data while the other cable is used to implement collision detection.

Desiring to transmit, a device transfers data on the transmit and receive data cable while concurrently transmitting on the collision detection cable a signal indicating its use of the transmit and receive data cable. Since it is possible for two devices to attempt transmission simultaneously, a device transmitting on the transmit and receive data cable is also required to monitor the signal of the collision detection cable to determine if another device is transmitting on the transmit and receive data cable. Since the signal level produced by each transmitting station is additive, it is thus possible to determine if more than one station is transmitting simultaneously on the cable by comparing the received signal on the collision detection cable versus a reference value. If such is the case, the transmitting devices must stop transmission, and wait an appropriate time before attempting to retransmit the data.

The present invention suggests that two separate coaxial cables be used to implement the transmit and receive functionality and the collision detection. Each of these coaxial cables have a characteristic impedance of 75 ohms. The transmit and receive cable, utilized for sending data, is terminated with a 75 ohm impedance, while the collision detection cable has a terminating impedance of 357 ohms. Since the ability to detect the collision detection signal is a function of coaxial cable length, terminating each cable with an impedance appropriate to its particular electrical properties provides for reliable communication with greater cable lengths than can be implemented when a single coaxial cable is utilized with CSMA/CD.

By practicing the current invention cable lengths over 600 meters can be obtained without repeaters, thus increasing the 500 meter distance limitation of the 802.3 standard.

BRIEF DESCRIPTION OF THE DRAWINGS

Other objects, advantages, and features of the present invention will be understood by those of ordinary skill in the art after referring to the complete written description of the preferred embodiment in conjunction with the drawings, wherein.

DETAILED DESCRIPTION

Figure 1:
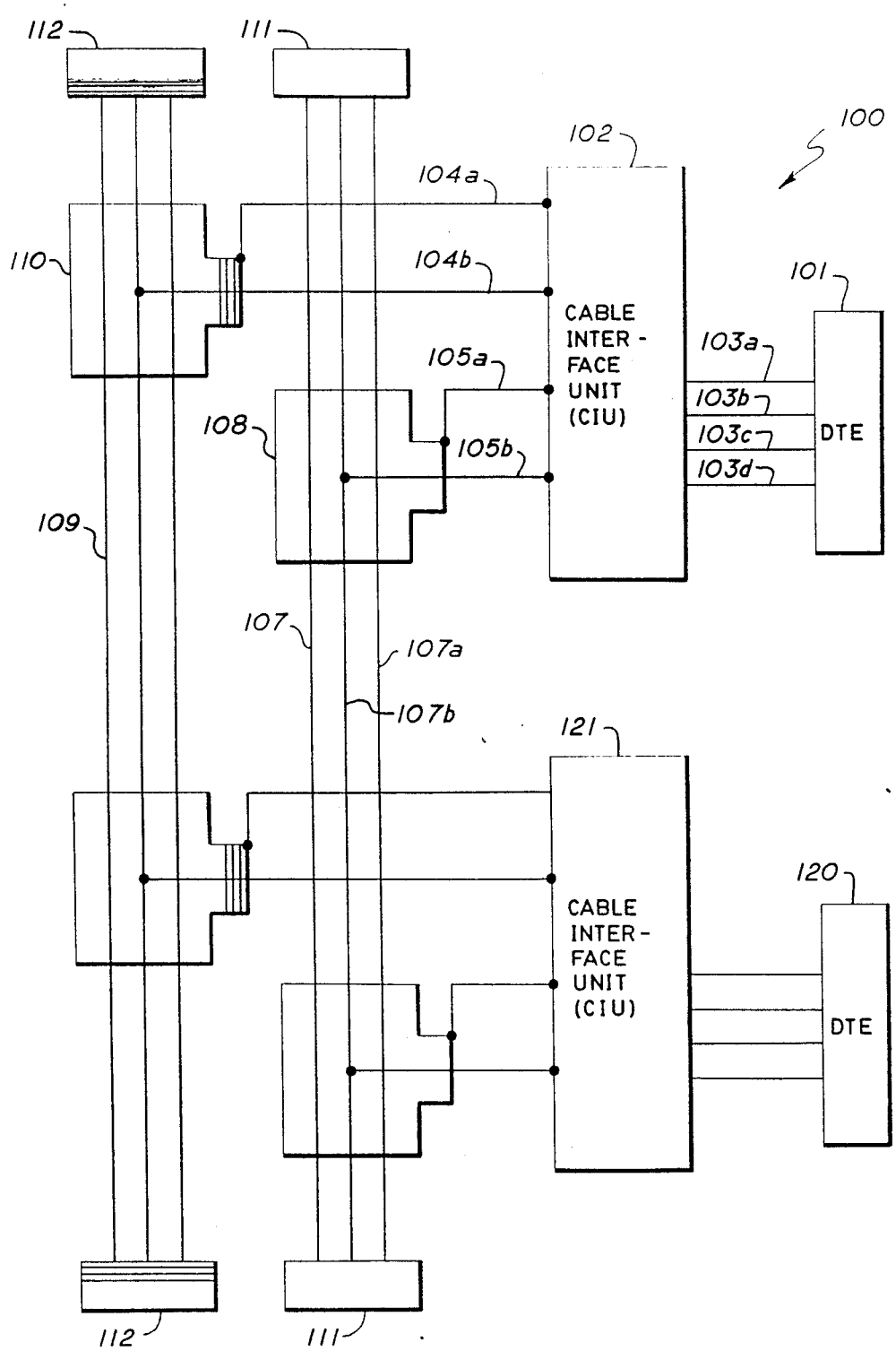
FIG. 1 is a schematic diagram of an embodiment of the present invention over an 802.3 network using two cables instead of one.

Referring now to FIG. 1. the following description presents the structure and operation of a communication system 100, incorporating a communicating device 101, also known as Data Terminal Eguipment (DTE), providing an input and output means for communicating with other such devices or computer systems. Communicating device 101 is coupled to a cable interface unit 102 via a connecting wire pairs 103a, 103b, 103c, and 103d. The cable interface unit 102 receives data transmitted from the communicating device 101 via wire pair 103b, and sends the data to another communicating device for which it is destined. Additionally, the cable interface unit 102 receives data from other communicating devices and transfers the data to the connected communicating device 101 via wire pair 103c. Wire pair 103a is utlized by the cable interface unit to notify the communicating device that a collision was detected, and wire pair 103d provides power to the cable interface unit.

In order to transfer or receive data to or from another communicating device 120, cable interface unit 102 is connected to two Local Area Network cables via connectors 104a, 104b, 105a, and 105b. Connectors 105a and 105b couple a cable interface unit 102 with the transmit and receive cable 107 via T connector 108, and connectors 104a and 104b couple the cable interface unit 102 to the collision detection cable 109 via T connector 110. Connectors 104a and 105a act as reference wires for their respective cables. The transmit and receive cable 107 acts as a medium to transfer data received from the cable interface unit 102.

When the cable interface unit 102 is transmitting data on transmit and receive cable 107, an additional signal is generated on the collision detection cable 109, which signifies that the transmit and receive cable 107 is in use.

In one embodiment of the invention a RG59U dual coaxial cable implements the two cables 107 and 109. Transmit and receive cable 107 is terminated at both ends by a BNC terminator of 75 ohm characteristic impedance thus suppressing reflections of the transmitted signals. Likewise the collision detection cable 109 is terminated at both ends by a 357 ohm TNC connector which assures that each cable interface unit recognizes a larger signal level on the collision detection cable when a second cable interface unit transmits. Utilizing RG59U coaxial cable provides the advantage that two coaxial cables are bonded together and thus can be strung as one cable. Cable 107 is comprised of a conductive outer shield 107a and a signal wire 107b. Likewise cable 109 is comprised of a conductive shield 109a and a signal wire 109b. One skilled in the art will recognize that many cable alternatives exist. Examples of alternatives are fiber optic cable, twisted pair wiring, and other grades and types of coaxial cable.

While cable interface unit 102 transmits data on transmit and receive cable 107 and concurrently transmits a collision detection signal on the collision detection cable 109, the cable interface unit 102 monitors the signal level on the collision detection cable 109. If a second cable interface unit 121 transfers data at the same time a cable interface unit 102, that cable interface unit also generates a signal on the collision dectection cable 109. The signals generated on the collision detection cable 109 are additive in nature, and thus the first cable interface unit 102 recognizes that the signal level on the collision detection cable 109 is higher than expected and a collision is declared. Once a collision has been declared cable interface unit 102 notifies communicating device 101 that such has occurred and the communicating device ceases transmission of data.

Figure 2:
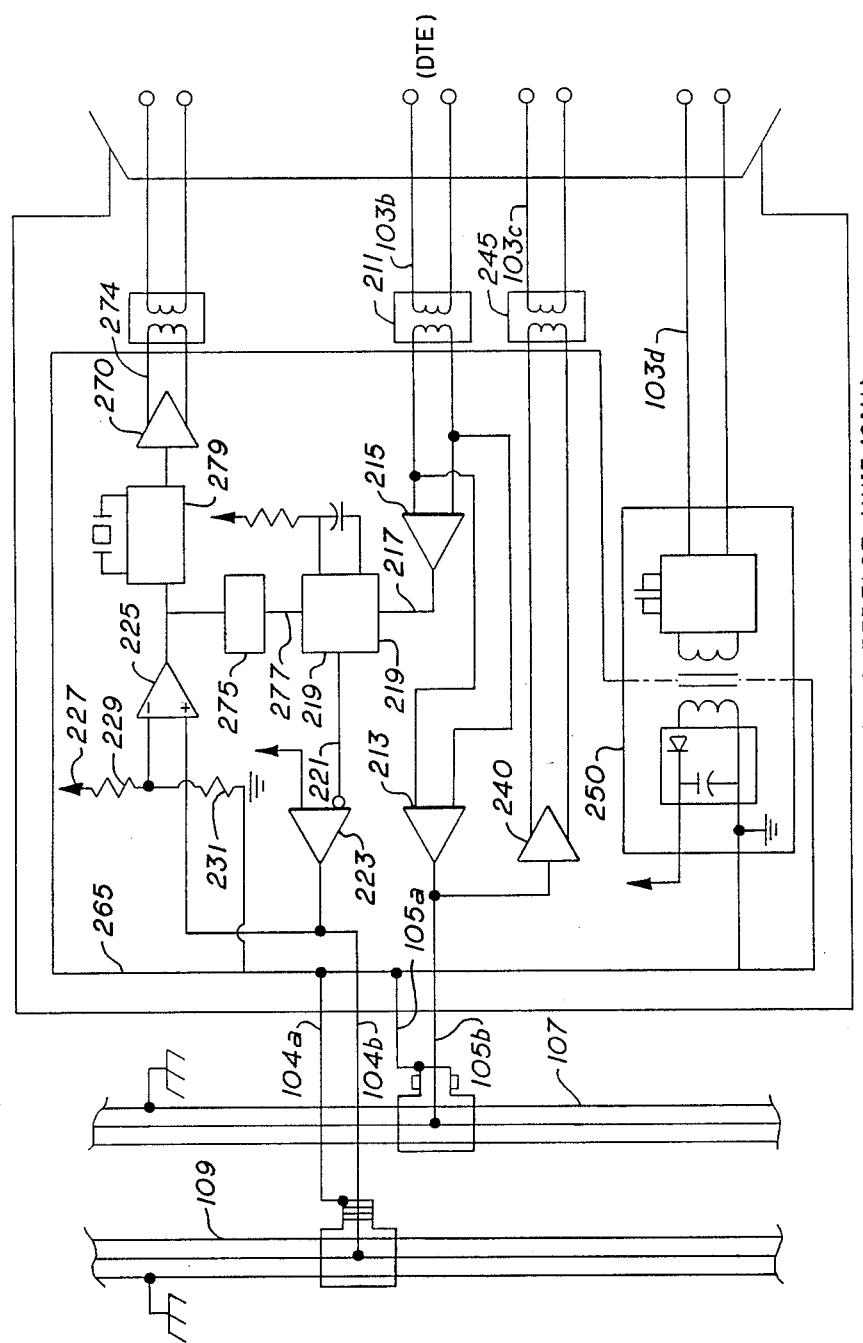
FIG. 2 is a block diagram of a cable interface unit, depicting details of the interconnect between the dual cables of the present invention and a cable interface unit.

Referring to FIG. 2, the cable interface unit 102 is shown in greater detail. As was shown previously, communicating device 101 is connected to cable interface unit 102 via wire pairs 103a through 103d. When data is transmitted from the communicating device 101 the data is sent to cable interface unit 102 via wire pair 103b. The electrical characteristics of the communicating device 101 are isolated from the cable interface unit 102 by transformer 211. This data is transferred to the transmit and receive cable 107 via line 105b by a transmitter 213. Transmitter 213 and receiver 240 are implemented in one embodiment of the invention as a DP8392 chip available from National Semiconductor, Inc.. The transmitted data is additionally sent via driver 215 and line 217 to the activity detector circuit 219 (ADC), and prepares collision detector driver 223 via line 221 to apply a D.C. collision detection signal on wire 104b to the collision detection cable 109. The potential of the collision detection cable 109 is applied by wire 104b as an input to comparator 225, which compares this voltage with a reference voltage from supply 227 in conjunction with the two collision reference resistors 229 and 231.

Comparator 225, implemented in an embodiment of the invention as a LM311, sensing an input voltage greater than the reference voltage produces an output indicating a collision has occurred. Consequently a 10Mhz signal is presented to the communicating device 101 via Signal Generator 279, line driver 270, line 274, and wire pair 103a thus notifying the device of the collision.

Standard 802.3 protocol specifies that the communicating device 101 after transmission of data to the cable interface unit 102 is complete receive from the cable interface unit a 1 microsecond signal after a delay of 1 microsecond. This signal assures the communicating device 101 that the collision detection/driving circuitry of the cable interface unit 102 is operating properly.

Signal Quality Error Test Generator 275, SQETG, is coupled to the output of activity detector 219, ADC, via line 277. The ADC 219 notifies the SQETG 275 of the end of transmission by the communicating device 101. The SQETG after notification of the end of transmission by the communicating device 101 delays for one microsecond and then sends a 10MHz signal for one microsecond via the Signal Generator 279 to driver 270 for transmission to the communicating device 101 on wire 103a. The communicating device 101 is thus notified that the transmission completed per the 802.3 requirements.

Data received from the transmit and receive cable 107 is received at the cable interface unit 102 via wire 105b. The data is sent to the communicating device 101 by receiver 240 via transformer 245 on wire pair 103c. In one embodiment of the present invention the receiver is implemented in conjunction with transmitter 213 as a DP8392 transceiver chip manufactured by National Semiconductor.

Power converter 250 is a DC/DC converter supplying power for elements of the circuit. A DC voltage is received on power pair 103d, and converted for use in the cable interface unit. This supply is conventional and thus will not be described in any further detail.

As mentioned previously, wire 105a is a reference wire for collision detection cable 109, while wire 104a performs the same function for the transmit and receive cable 107. Both of these lines are connected to circuit return 265 in the cable interface unit 102.

Figure 3:
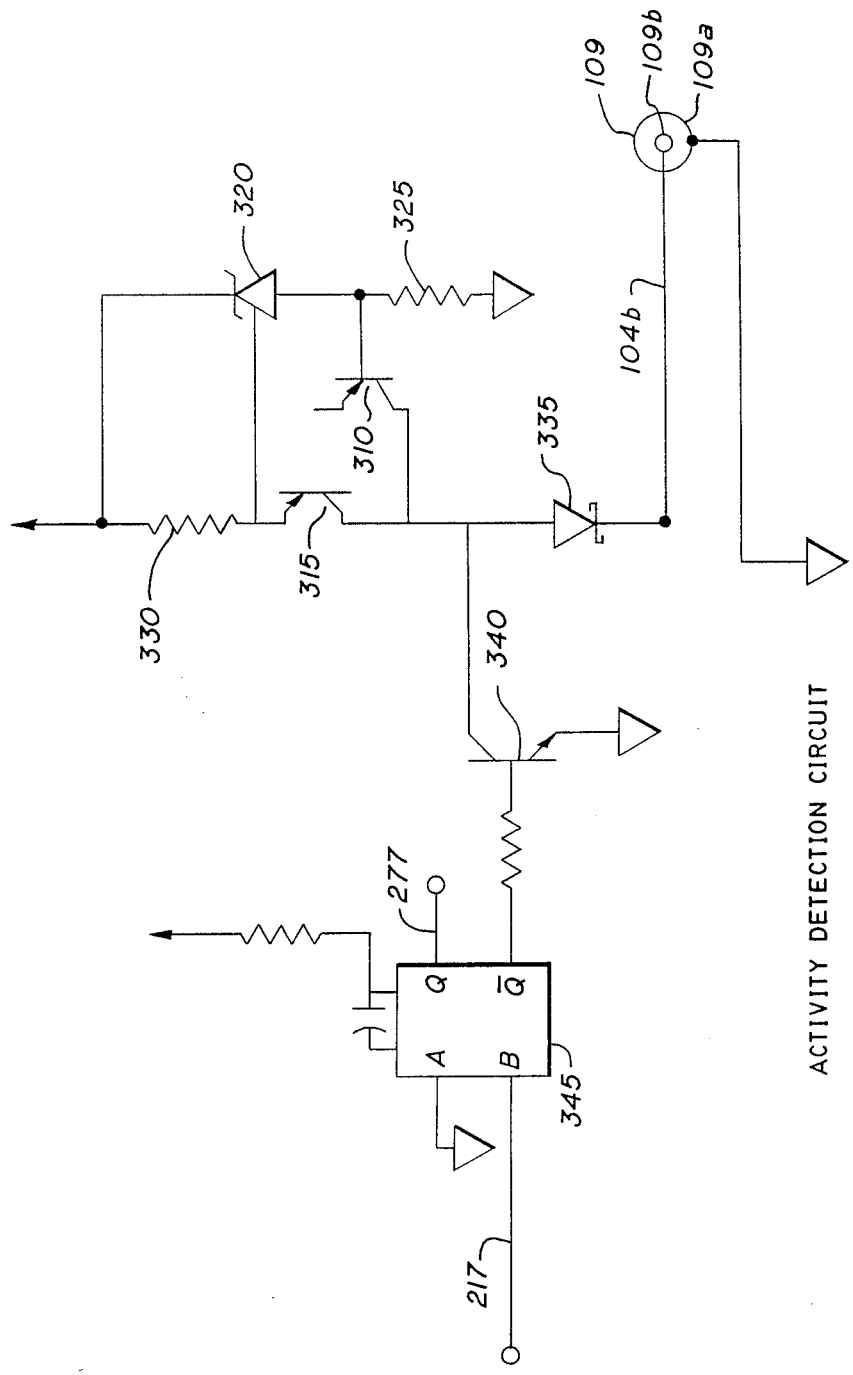
FIG. 3 is a schematic diagram of an activity detection circuit to detect transmissions of the local cable interface unit, and an collision cable driver circuit in an embodiment of the present invention.

Turning now to FIG. 3 for a detailed description of the activity detector and collision signal circuitry. PNP transistor 310 along with PNP transistor 315 operate as a Darlington pair to generate a 20mA D.C. signal onto collision cable 109. The two transistors are biased by adjustable voltage regulator 320, implemented as a LM385 chip. Resistor 325 is a bias resistor while resistor 330 sets the current through Schottky diode 335.

Since the 20mA current is placed on the collision detection cable 109 only when there is transmit activity on transmit and receive cable 107, this current source must be switchable. NPN transistor 340 acts as this switch and is controlled by a monostable multivibrator 345 implemented as a 74HC123. These two circuit elements act in conjunction to operate as the activity detector circuitry. When multivibrator 345 sees activity on line 217 generated by driver 215, it outputs a low to turn "off" transistor 340. The transistor 340 operates in cutoff and all current generated by transistor pair 315 and 310 flows to the collision detection cable 109 via line 104b. When there is no transmit activity on line 217, the multivibrator 345 turns transistor 340 "on" and all current generated by transistors 310 and 315 goes to ground through the transistor's emitter. Thus the collision detection signal is only applied to cable 109 when data is being transmitted.

Figure 4:
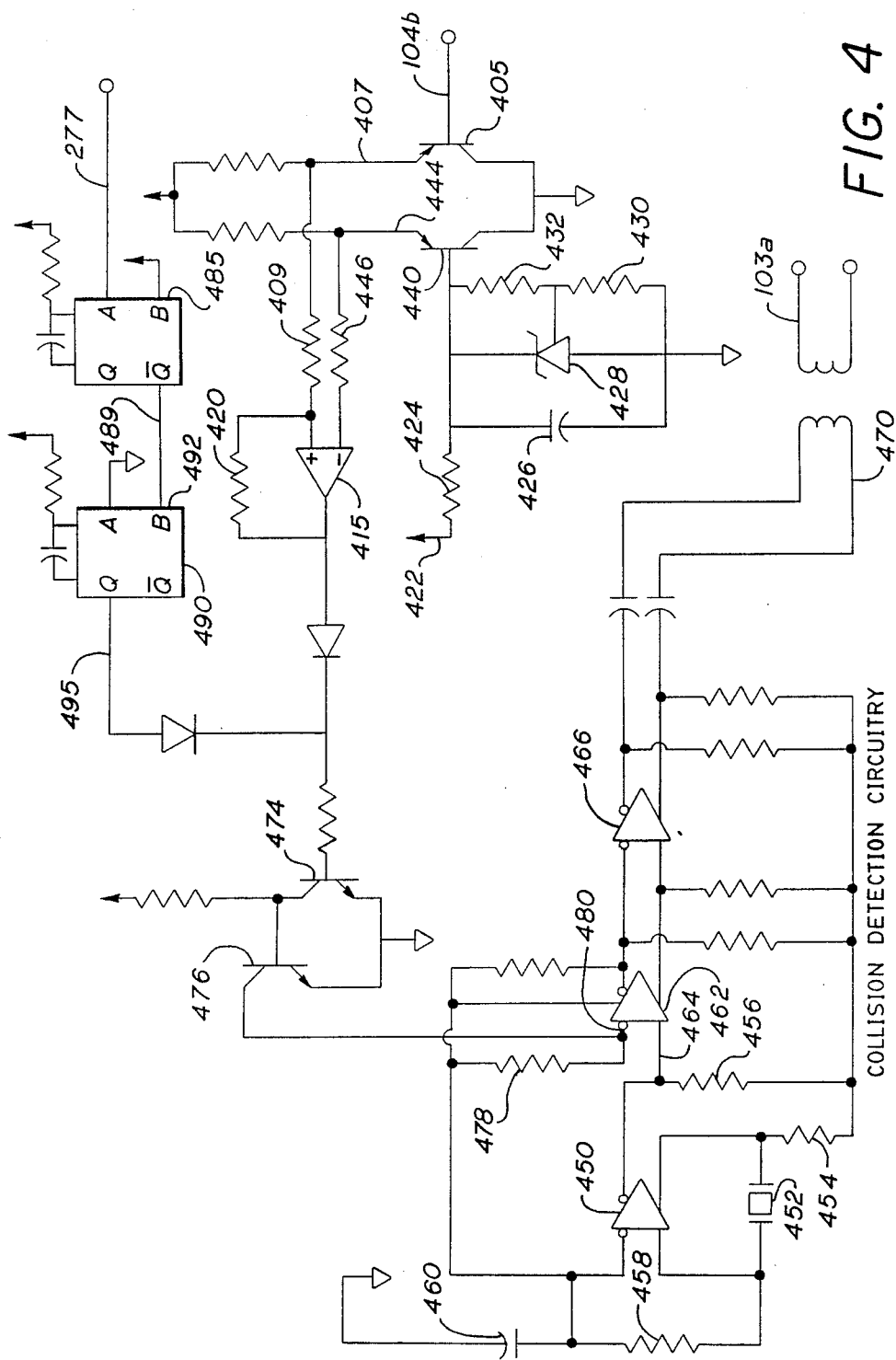
FIG. 4 is a schematic diagram of collision detection circuitry for an embodiment of the invention.

Turning now to FIG. 4 which depicts the collision detection circuitry. Line 104b connects the collision detection cable 109 to the cable interface unit 102. A voltage on the collision detection cable is sensed a the base of PNP transistor 405. This voltage is added to the base to emitter voltage of transistor 405 and is presented via lines 407 and 409 as the non-inverting input of comparator 415. Comparator 415 employs positive feedback in the form of resistor 420 thus resulting in a hysteresis effect. Such a comparator with positive feedback is known by those skilled in the art as a Schmitt trigger. Supply voltage source 422, resistor 424, capacitor 426, ajustable voltage regulator 428, and resistors 430 and 432 set a voltage as input to the base of PNP transistor 440. This voltage increased by the base to emitter voltage of transistor 440 is presented via lines 444 and 446 as a reference voltage to the inverting input of comparator 415.

Accounting for the hysteresis effect, a signal on line 409 exceeding the reference voltage on line 446 will result in a collision being declared In compliance with the 802.3 standard, a 10 Mhz square wave is transmitted to communicating device 101 when a collision is determined. The Signal Generator will now be described. This 10 Mhz square wave is generated by line receiver 450 in conjunction with a 10 Mhz crystal 452, resistors 454, 456, and 458, and capacitor 460. Line driver 450 is implemented as a MC10116 integrated chip which is manufactured by Motorola. The specification for the MC10116 is incorporated by reference into this application. The output of the square wave generator is presented to line driver 462, implemented again as a MC10116 IC, via line 464 for wave shaping and then to driver 466, another MC10116, for further wave shaping. The output of driver 466 is applied to device 101 through transformer 470. The transformer electrically isolates the communicating device 101 from the cable interface unit 102.

Line receiver 450 generates a free running square wave, and NPN transistors 474 and 476 switch the transfer of the square wave to the communicating device 101 via transformer 470 only when a collision is declared.

Describing the switching capabilities in detail, comparator 415 presents a voltage to the base of transistor 474 when the signal voltage on line 409 exceeds the reference voltage on line 446, thus indicating that a collision has been detected. This input voltage to the base of transistor 474 saturates the transistor, and thus forces transistor 476 into cutoff. The collector to emitter voltage of transistor 476 set by resistor 478 is applied to line receiver 462 at input 480 thereby enabling receiver 462 which transmits the generated square wave to line receiver 466 and transformer 470. Communicating device 101 is thus notified of the collision.

A reference voltage signal on line 446 exceeding the signal on line 409 produces a low at the output of comparator 415, thus indicating that no collision has been detected. This low voltage forces transistor 474 into cutoff and thus saturates transistor 476. As a result the input 480 to line receiver 462 is forced to ground and the line receiver 462 turned off. No collision detection signal is transmitted to communicating device 101.

Focusing still on FIG 4. The Signal Quality Error Test Genertor circuitry will now be described. Monostable Multivibrator 485 is notified of the end of transmission by Activity Detector 219 on line 277.

The A input 487 to the multivibrator 485 triggers on the falling edge of the input, and thus provides a one microsecond signal on the complemented output line 489 which is thus input into a second monostable multivibrator 490. Multivibrator 490 utilizes the B input 492 which triggers on the rising edge. Since the B input 492 is generated by the complemented output 489 of multivibrator 485, a one microsecond delay is incurred before a 1 microsecond signal is output on line 495.

The signal on 495 is input to NPN transistor 474 which turns "on" and forces transistor 476 into cutoff, thus switching the square wave driver circuitry into operation as described previously.

While the invention has been particularly shown and described with reference to the preferred embodiment thereof, it will be understood by those skilled in the art that various changes ion form and details may be made therein without departing from the spirit and scope of the invention.

What I claim is:

1. A local area network (LAN) communication system comprising a plurality of data terminal equipment (DTE) with each DTE including at least a transmit signal line, a receive signal line and a collision signal line for, respectively, transmitting data from the DTE in an CSMA/CD format, receiving data into the DTE in an CSMA/CD format and receiving a signal into the DTE in an CSMA/CD format indicating the detection of a data collision, a data coaxial cable at least three meters long coupled to the DTEs for transmission between DTEs of electrical signals representative of serial digital data, a reference coaxial cable of substantially the same length as the data cable coupled to the DTEs for electrically indicating to the DTEs when two or more DTEs are transmitting data onto the data cable at the same time, the data and reference cables comprising dual coaxial cables that are mechanically coupled to each other over a substantial portion of their length as if the two were a single cable and a plurality of cable interface units (CIUs) wherein a single CIU is coupled between a single DTE and the data and reference cables, each CIU including at least first, second and third isolation circuits coupled to the receive, transmit and collision signal lines respectively of the DTEs for electrically isolating the CIUs and DTEs from each other, a transmitter circuit coupled to the transmit signal line of a DTE through the first isolation circuit and to the data cable for transmitting serial data onto the data cable, a receiver circuit coupled to the data cable and to the receive signal line of the DTE through the second isolation circuit for receiving serial data transmitted by a remote DTE and for transmitting the received data to the local DTE, a collision signal circuit also coupled to the transmit signal line of the local DTE through the first isolation circuit and to the reference cable for applying a collision signal to the reference cable concurrently with the transmission of data by the local DTE for indicating to remote DTEs that a DTE is transmitting data onto the data cable and a collision detection circuit including
a comparator circuit coupled to the reference cable for testing a signal on the reference cable including the collison signal applied to the reference cable by the local DTE and like signals, if any, applied to the reference cable by one or more remote DTEs and for generating an output signal indicating when two or more DTEs are transmitting data onto the data cable at the same time and a generator circuit coupled to the comparator circuit and to the collision signal line of the local DTE through the third isolation circuit for signaling the local DTE in response to the output signal indicating that two or more DTEs are transmitting data onto the data cable at the same time wherein the local DTE, functioning in accordance with an CSMA/CD procedure, in response to the output signal stops transmission of data and restarts the transmission of the same data after a delay.

2. The system of claim 1 wherein
the comparator circuit includes an amplifier having first and second inputs with the first input coupled to the output of the collision signal circuit and to the reference cable and with the second input coupled to a standard signal source for comparison to signals on the reference cable coupled to the first input and wherein the amplifier produces said output signal when a signal at the first input of the amplifier is comprised of collision signals applied to the reference cable by two or more DTEs.

3. The system of claim 2 wherein the generator circuit includes a circuit coupled between the amplifier and the third isolation circuit for generating a 10 MHZ signal for signaling the local DTE that a collision of data has taken place on the reference cable.

* * * * *